United States Patent Office 2,998,349
Patented Aug. 29, 1961

2,998,349
VACCINE AGAINST AVIAN RESPIRATORY
INFECTION
Oliver H. Peterson, Peter H. Matisheck, and Reed R.
Rumsey, Charles City, Iowa, assignors to Dr. Salsbury's Laboratories, a corporation of Iowa
No Drawing. Filed Apr. 3, 1958, Ser. No. 726,057
6 Claims. (Cl. 167—78)

This invention relates to the art of immunization of poultry against a newly encountered type of respiratory infection. More particularly out invention pertains to the production of an artificial virus culture of attenuated pathogenicity and stabilized titer for use as a vacine against an avian respiratory infection which bears some clinical and pathological resemblance to infectious laryngotracheitis. The invention also includes the vaccine itself effective in the active immunization of fowl susceptible to the disease which is caused by a newly discovered primary microorganism as hereinafter set forth.

Infectious laryngotracheitis in chickens and other domesticated birds is a communicable respiratory disorder which has been known for about thirty-five years. The condition has been recognized as a distinct and well-defined epizootic and its name was established at the recommendation by the special Committee on Poultry Diseases of the American Veterinary Medical Association. Its principal mode of dissemination is by direct contact and through contaminated feed and water. It has been established by serological and virological tests that virus carriers continue as a source of exposure for long periods of time following an outbreak of the disease. Typical signs of the infection are coughing, gasping and throat rattles, sometimes accompanied by lacrimation. Mortality in most epizootics reaches a level of 15%; mild outbreaks have a course of two to three weeks and death losses are lower. On necropsy the birds show an inflammation of the trachea whose mucuous membrane is covered with a blood-stained exudate. This is fairly characteristic of the acute form of infectious laryngotracheitis. Other common signs are cheesy plugs in the larynx and upper trachea. The plugs consist of necrotic tissue and may block the entrance of the windpipe, thereby causing asphyxia and death. A number of commercial vaccines derived from tracheal exudates of infected chickens with subsequent egg propagation have been prepared and are employed for active immunization.

It has been found, however, that the antigenic properties of these commercial products as well as those of vaccines against other respiratory disorders frequently fail to protect the flocks against outbreaks of similar nature, erupting from hitherto unexposed etiological sources. Our present invention is based on the discovery through extensive field and experimental investigations that such failures must be traced to the presence of another previously unrecognized respiratory infection whose pathogenic factor is unresponsive to the immunogenic properties of the currently known vaccines. Although the clinical symptomatology and pathology of the newly diagnosed condition approaches infectious laryngotracheitis more closely than other respiratory ailments, it has been established that it is a distinct and separate disease entity which is produced by a specific primary virus. This new agent has been found in and can be obtained from respiratory organs such as the mouth, trachea, larynx, lungs and air sacs, from lymphoid tissues, and from liver, spleen and gastrointestinal tract of diseased birds. In a specific instance a tracheal isolate was prepared from flocks in Arkansas and after suitable purification, and propagation in embryonated eggs as set forth below in greater detail was deposited as a culture of the living organism under the designation strain No. 87101 with the American Type Culture Collection, 2112 M Street, NW., Washington, D. C. The virus will hereinafter be referred to as agent or strain No. 87101.

Respiratory infections caused by our newly discovered organism and unopposed by the presently known commercial antigens were encountered in many parts of the United States. A large scale survey of five of the major poultry areas of the Union revealed a high incidence of infection caused by this agent based on the use of the virus serum-neutralization tests conducted in chick embryos. A flock was considered as positive when one out of five birds indicated the presence of specific antibodies in the serum. Thus is was found that out of 51 flocks in the Delmarva Penninsula, ranging in size from 1,000 to 20,000 birds, 31% showed positive reactions. In northwestern Arkansas 47 flocks whose numbers varied from 100 to 50,000 chickens disclosed a 32% prevalence. In Indiana we observed 32% of positive findings in 25 flocks of 2,000 to 15,000 birds. In Mississippi 50 flocks having a size from 4,000 to 50,000 were inspected and 25% of them were positive.

As previously stated, the strain No. 87101 infection produces signs comparable to those in ordinary infectious laryngotracheitis, although in milder form. Early manifestations are sneezing, coughing and gasping occasionally with attendant conjunctivitis. The disorder strikes primarily young broilers of an age of 4 to 6 weeks and causes a general state of morbidity, lower feed conversion and emaciation. Mortality varies from 3½ to 5%. If it is considered that about 30 million chicks are started weekly in the United States, that each of these birds is a potential carrier of the disease, and that growth retardation, debility and death losses as a result of the infection may depreciate the value of a flock by at least 10%, then it is easily seen that the possible damage to the poultry industry sustained by this epizootic may reach the staggering figure of 100 million dollars per year. The problem involved is all the more serious since the outward signs of the disorder are similar to those of infectious laryngotracheitis so that in misapprehension of the condition the vaccination with commercial infectious laryngotracheitis vaccines may lure the poultry raiser into a sense of false security. The discovery of the real nature of the disease and its pathogenic agent, therefore, constitutes an important and valuable advance in veterinary medicine in that it provides the starting material for the production of a specific antigen against this previously unknown and misdiagnosed epizootic.

The material and significant differences between infectious laryngotracheitis and strain No. 87101 infections appear on pathological examination. While at necropsy, infectious laryngotracheitis infected birds show the trachea to contain free blood, the hemorrhagic exudate in agent 87101 infections is serosanguineous. In the latter case, however, and contrary to that observed in infectious laryngotracheitis, there is found a characteristic turbidity or clouding of the air sacs. Chick embryo pathology reveals even more typical distinctions on which a proper differential diagnosis can be made. When a viral isolate of infectious laryngotracheitis is inoculated onto the chorion of 10 to 11-day-old embryonated eggs, areas of greyish swellings on the chorioallantoic membrane are observed by the third day. Lesions on the embryos themselves and mortality are rather sporadic. Not all the embryos with morbid tissue changes succumb. Injection into the chorioallantoic sac produces slight scattered pock-like nodules on the membrane without affecting the blood vessels. Contrary thereto inoculation of agent 87101 into the allantoic sac causes widely diffuse lesions in the embryo itself with unfailing regularity. After three days extensively scattered hemorrhagic foci appear on the head, legs, feet and other organs of the embryo, and considerable damage to the heart, liver, spleen and kidneys is evident indicating the presence of a widespread invasion. The lesions appear in the vicinity of the blood vessels which are ultimately destroyed. Implantation onto the chorion does not produce the greyish focal thickening characteristic of infectious laryngotracheitis virus, but a considerable amount of intumescence and the same type of lesions as when inoculation is made into the allantoic sac is found. Unlike the condition produced by infectious laryngotracheitis virus, the mortality pattern in 87101 infections is higher and constant in that all embryos afflicted with lesions invariably die. In a typical example viral inoculates of infectious laryngotracheitis and of agent 87101, after the first passage, were implanted into 10- to 11-day-old embryos in dilutions from $10^{-0}$ to $10^{-6}$ and incubated for seven days. In both infections all the embryos showed lesions up to the titer of $10^{-4}$. However, while in infectious laryngotracheitis, despite the presence of pathological tissue changes, the death rate was decreasing between $10^{-2}$ and $10^{-4}$, with no mortality occurring at $10^{-5}$ to $10^{-6}$, it was found that every embryo with lesions induced by strain 87101 was killed without exception and regardless of the titer to which it was exposed. The reason therefor lies in the fact that agent 87101 carries the disease into the embryo itself while in infectious laryngotracheitis the affected area is more restrictively localized on the chorioallantoic membrane.

The occurrence of strain 87101 as a distinct and separate viral entity has been further confirmed by immunological studies.

One hundred forty birds, nine weeks of age, which had acquired immunity against Newcastle disease, infectious bronchitis, infectious laryngotracheitis, and fowl pox through previous infection were challenged with 1,000 embryo lethal doses ($ELD_{50}$) of a virulent culture of agent 87101 harvested from one single egg passage. The infective culture was administered in drinking water.

A second group of forty birds which had been vaccinated against the same four diseases was challenged in the identical manner with agent 87101. The results are summarized in Table I.

*Table I*

| Test No. | No. of Birds | Type of Immunity | | | | Method of Challenge with Agent 87101 | Response to Challenge Clinical Signs, Percent |
|---|---|---|---|---|---|---|---|
| | | ND | IB | ILT | FP [1] | | |
| 1 | 140 | (+) | (+) | (+) | (+) | drinking water | 90-100 |
| 2 | 40 | + | + | + | + | do | 90-100 |

[1] The following abbreviations and symbols have been used in the foregoing table:
ND=Newcastle disease.
IB=infectious bronchitis.
ILT=infectious laryngotracheitis.
FP=fowl pox.
(+)=Immunity acquired by previous disease.
+=Immunity acquired by vaccination.

As can be seen from the tests in Table I, neither naturally acquired nor artificially induced immunity against any of the four respiratory infections was able to protect the birds against a challenge with agent 87101 in response to which 90 to 100% of them showed typical clinical signs of rales, coughing, sneezing and conjunctivitis. This evidences the immunological unrelatedness between agent 87101 and the other pathogenic respiratory organisms.

A similar study on bird transmission of agent 87101, but extended to a broader range of ages and including necropsy findings is summarized in Table II. Chickens of the age of 5 weeks, 9 weeks and 1 year which were previously vaccinated against Newcastle disease, infectious bronchitis, and infectious laryngotracheitis were challenged with the virus 87101 and the response to the challenge was recorded in terms of clinical signs and presence of lesions. In every test run agent 87101 was reisolated from the infected birds and transmitted to healthy specimens which contracted the disease as manifested by clinical signs and necropsy examinations. In addition tracheal exudates from these reinfections were harvested and cultured in chicken embryos which developed the typical aforedescribed pathological tissue reactions.

*Table II*

| Test No. | Age of Birds | Type of Immunity | | | Method of Challenge with Agent 87101 | Response to Challenge Clinical Signs, Percent | Lesions [2] |
|---|---|---|---|---|---|---|---|
| | | ND | IB | ILT[1] | | | |
| 1 | 5 weeks | + | + | + | intranasal | 100 | 29/29 |
| 2 | 1 year | + | + | + | drinking water | 100 | 2/2 |
| 3 | 9 weeks | + | + | + | intramuscular | 90 | 1/1 |

[1] The figures and symbols in the foregoing table have the same meaning as in Table I.
[2] The column "Lesions" lists the number of birds showing pathological tissue changes compared to the number of birds examined.

Table II demonstrates that vaccinated chickens with active immunity against Newcastle disease, infectious bronchitis and infectious laryngotracheitis were not resistant to agent 87101. Mortality was highest in younger birds though all of them developed typical signs. However in every instance all autopsied birds showed lesions characteristic of the virus.

Serum-neutralization tests indicated that there was little antigenic relationship between strain 87101 and the infectious laryngotraceitis virus. When serum from an infectious laryngotracheitis immune animal or bird was mixed with an isolate of agent 87101 and inoculated into the allantoic cavity of 10- to 11-day-old embryos, a finding of substantial lesions and fatalities was proof of the fact that the antibodies specific to infectious laryngotracheitis virus left the embryonated eggs unprotected against the viral inoculum.

While cultures of agent 87101 in embryonated eggs after the first passage still produce the full pathological effects of the disease as shown in Tables I and II, we have found that their virulence for fowl can be gradually reduced by consecutive transfers so as to make them adaptable for active immunization. An incipient stage of attenuation is reached after the sixth serial passage at which the organism has lost so much of its original pathogenicity that it can be used for immunization purposes even though it may yet provoke some mild and very temporary disease signs. We have likewise discovered, however, that in spite of the decreasing rate of virulence through up to 51 serial transmissions the culture retains sufficient immunogenic potency and that beginning with the tenth passage is not only completely attenuated, but also maintains a stabilized and therapeutically effective titer level. The level no longer declines and can be reproduced continuously with every succeeding passage. Thus, for instance, 0.2 ml. of original inoculate of a ground chorioallantoic membrane had a titer reading of $10^{2.5}$ after the fourth transfer and of $10^{3.8}$ after the fifth, whereas starting with the tenth passage the titratable viral potency remained steady between $10^4$ and $10^5$. Likewise after ten serial transmissions there was found a constancy of the number and appearance of lesions in the embryonated eggs which priors to that stage were subject to appreciable variations. While, therefore, an artificial culture of six egg passages can be employed to good advantage for vaccination within the purview of our invention, a further and preferred embodiment of our discovery consists in a new vaccine and its method of production involving the use of ten serial egg transmissions of agent 87101 as illustrated, but not limited to, the following example.

Strain No. 87101 was isolated from four-week-old broilers from a flock in Arkansas. The inoculate was prepared from the tracheas, lungs, and larynx though it was also available from the mouth, the air sacs, other respiratory organs, as well as liver spleen, lymphoid tissue, and the gastrointestinal tract. The exudates and mucous linings were removed from the tissues. This material was then placed in a sterile motar containing sterile sand and was ground. The ground substance was thereupon suspended in a 1:10 sterile saline solution containing 4,000 units of penicillin and 40 mg. of dihydrostreptomycin per ml. The solution was allowed to stand at room temperature for about 20 minutes to inactivate bacteria which might be present. The material was then centrifuged and the supernatant fluid decanted. The liquid inoculum was implanted into the chorioallantoic system, i.e. either the allantoic membrane or the cavity of 7- to 13-day-old embryonated eggs and the growth of the viral agent was harvested after incubation for at least three and preferably about six days. The inoculum was prepared by grinding the embryo, the chorioallantoic membrane and the allantoic and amnionic fluids and treating the material with antibiotics in the previously described manner. Additional serial passages were made by injecting 0.2 ml. of the inoculum into the allantoic sac of other embryos. After the final transfer the culture was ground, mixed with a stabilizer and lyophilized in the usual way into the finished vaccine.

Attenuated and stabilized virus cultures produced in accordance with the above-outlined procedure have been found to be safe, reliable and effective vaccines against outbreaks of respiratory infections induced by agent 87101. In a specific test fifty four-week-old broilers were vaccinated introcloacally with a culture prepared by ten serial transmissions. After four weeks these birds together with 50 nonvaccinated control specimens of the same age were challenged by intratracheal inoculation of 1,000 $ELD_{50}$ doses of virulent strain No. 87101. Within 48 hours all the controls developed typical respiratory signs and 15 succumbed to the infection. None of the vaccinated broilers showed any lingering signs of the disease except for a few sporadic and transient instances of sternutation. All the birds were necropsied at various periods after the seventh day from inoculation. Post-mortem examinations of the control birds revealed the characteristic pathological pattern of 87101 infection, particularly an inflammation of the trachea with abundant nonhematoid mucus, caseous exudates and clouding of the air sacs. No pathology was found in the tissues of any of the vaccinated specimens. To establish the identity of the virus, a viral isolate was prepared from the trachea of the infected test birds and implanted into 10- to 11-day-old chick embryos which were incubated for a maximum of seven days. Those showing lesions in the interval were opened and the chorioallantoic membrane was removed for microscopic study. The tissue changes were in all respects identical with those previously observed.

While mixtures of different microorganisms either in their original virulent or in their modified and attenuated form most frequently lose their activity on account of interference or mutual inhibition, we have discovered that such incompatibility does not exist between agent 87101 and the pathogenic virus of infectious laryngotracheitis. We have found that such viral cultures or their finished vaccines can be used in a combination package so as to form a polyvalent vaccine preparation of a wider therapeutic range. The practical importance of such a biological product is manifest in view of the fact that the resemblance in the syndromic picture of infectious laryngotracheitis and 87101 infection is liable to lead to diagnostic errors before a full and complete serological, virological, and histopathological examination is performed. It is furthermore an obvious advantage for the poultry raiser to be able to immunize his flocks against both disorders by a single vaccination with one polyvalent antigenic product so as to be sure that adequate protection against both types of outbreaks is afforded. It was therefore an interesting and surprising discovery and constitutes an additional and important object of the present invention that attenuated cultures of the common infectious laryngotracheitis virus and agent 87101 can be incorporated together into one polyvalent antigenic preparation without loss of immunogenicity.

Although we have illustrated our invention on chickens of various ages, it will be apparent to those skilled in the veterinary arts that our new vaccine is likewise applicable to other species of domesticated fowl. It should also be understood that while we have described the invention in accordance with our preferred embodiments, many equivalent variations and modifications may be resorted to without departing from the scope of the following claims:

1. A process of preparing a vaccine for immunizing poultry against respiratory infection comprising the steps of isolating live virus ATCC No. 87101 from viruliferous tissues of the diseased birds, sterilizing the isolate against bacterial contaminations, injecting the isolate into the chorioallantoic system of embryonated eggs, incubating the eggs for at least three days, harvesting the inoculum from the chorioallantoic menstruum of said eggs and serially passing it in the same manner through the chorioallantoic system of other embryonated eggs for not less than five consecutive passages.

2. A process of preparing a vaccine for immunizing poultry against respiratory infection comprising the steps of transferring culture of live virus ATCC No. 87101 into the chorioallantoic system of embryonated eggs, incubating the eggs for at least three days, harvesting the inoculum-containing culture from the chorioallantoic menstruum of said eggs and serially passing it in the same manner through the chorioallantoic system of other embryonated eggs for not less than five consecutive passages.

3. A process of preparing a vaccine for immunizing poultry against respiratory infection comprising the steps of isolating live virus ATCC No. 87101 from viruliferous tissues of the diseased birds, sterilizing the isolate against bacterial contaminations, injecting the isolate into the chorioallantoic system of embryonated eggs, incubating the eggs for at least three days, harvesting the inoculum from the chorioallantoic menstruum of said eggs and serially passing it in the same manner through the chorioallantoic system of other embryonated eggs for not less than nine consecutive passages.

4. A process of preparing a vaccine for immunizing poultry against respiratory infection comprising the steps of transferring culture of live virus ATCC No. 87101 into the chorioallantoic system of embryonated eggs, incubating the eggs for at least three days, harvesting the inoculum-containing culture from the chorioallantoic menstruum of said eggs and serially passing it in the same manner through the chorioallantoic system of other embryonated eggs for not less than nine consecutive passages.

5. A respiratory virus vaccine product for poultry comprising a chorioallantoic menstruum of embryonated chicken egg origin and live virus ATCC No. 87101 attenuated by consecutive serial passages through said embryonated chicken eggs, said vaccine being capable of immunizing fowl against said virus infection, having an $ELD_{50}$ titer of at least $10^{3.8}$, and being produced in accordance with claim 1.

6. A respiratory virus vaccine product for poultry comprsing a chorioallantoic menstruum of embryonated chicken egg origin and live virus ATCC No. 87101 attenuated by consecutive serial passages through said embryonated chicken eggs, said vaccine being capable of immunizing fowl against said virus infection, having an $ELD_{50}$ titer of about $10^4$ to $10^5$, and being produced in accordance with claim 3.

(References on following page)

References Cited in the file of this patent

Beveridge: The Cultivation of Viruses and Rickettsiae in Chick Embryo, His Majesty's Stationery Office, London, 1946, pp. 52–54, 57–59, 63–65, 76, 77.

Kelser: Manual of Vet. Bact., The Williams and Wilkins Co., Baltimore, 5th ed., 1948, pp. 613, 614, 616–624.

Thompson: Am. J. Vet. Research 15: 55, April 1954, pp. 293–297.

Markham: Poultry Sc. 35: 2, March 1956, pp. 390, 397.

Am. J. Vet. Research, July 1946, pp. 294–305, 307–332, 341–342.

Delaplane: Amer. J. Vet. Res., 4: 13, 1943, pp. 325–332.

Animal Diseases, Yearbook of Agriculture 1956, U.S. Dept. of Agr., Washington, D.C., pp. 476–478, 480–484.